(12) United States Patent
Spartiotis et al.

(10) Patent No.: US 9,029,793 B2
(45) Date of Patent: May 12, 2015

(54) IMAGING DEVICE

(75) Inventors: Konstantinos Evangelos Spartiotis, Espoo (FI); Stefan Jurthe, Espoo (FI); Markku Tapio Eräluoto, Espoo (FI)

(73) Assignee: Siemens Aktiengesellschaft, Munich (DE)

( * ) Notice: Subject to any disclaimer, the term of this patent is extended or adjusted under 35 U.S.C. 154(b) by 875 days.

(21) Appl. No.: 10/420,834

(22) Filed: Apr. 23, 2003

(65) Prior Publication Data

US 2004/0212708 A1     Oct. 28, 2004

Related U.S. Application Data

(63) Continuation of application No. 09/209,829, filed on Dec. 11, 1998, now abandoned.

(30) Foreign Application Priority Data

Nov. 5, 1998   (GB) .................................... 9824276.1

(51) Int. Cl.
*H01L 27/146*   (2006.01)
*H04N 5/32*    (2006.01)

(52) U.S. Cl.
CPC ........................................ *H04N 5/32* (2013.01)

(58) Field of Classification Search
USPC .......................... 250/370.09; 378/21, 37, 98.8
See application file for complete search history.

(56) References Cited

U.S. PATENT DOCUMENTS

| | | | |
|---|---|---|---|
| 4,106,046 A | 8/1978 | Nathanson et al. | ............ 257/234 |
| 4,142,199 A * | 2/1979 | Simi et al. | ...................... 257/251 |
| 4,188,709 A | 2/1980 | Lorenze et al. | |
| 4,239,312 A | 12/1980 | Myer et al. | |
| 4,257,057 A | 3/1981 | Cheung et al. | |

(Continued)

FOREIGN PATENT DOCUMENTS

| | | |
|---|---|---|
| EP | 0415541 A1 | 3/1991 |
| EP | 0556820 A1 | 2/1993 |

(Continued)

*Primary Examiner* — David Porta
*Assistant Examiner* — Shun Lee
(74) *Attorney, Agent, or Firm* — Harness, Dickey & Pierce, P.L.C.

(57) ABSTRACT

An imaging device (6) for scan-imaging radiation includes an imaging cell array (3) comprising an array of detector cells generating charge in response to incident radiation (1) and an array of pixel circuits each pixel circuit associated with a respective detector cell. The pixel circuit includes circuitry for accumulating plural radiation hit on an associated detector cell and transfer circuitry shifting upon command the accumulated value of all pixels by one step in one dimension (e.g., row by row). The imaged object (2) moves at a speed $V_{OPT}$ (7) with respect to the radiation source and the imaging detector (or source and detector move at $-V_{OPT}$ with respect to the object) on which the accumulated values are shifted are with $V_{TDI}$ (8). $V_{TDI}$ may equal $V_{OPT}$ in value and direction. Thus, a value is accumulated in a moving information package using multiple pixels (10) and referring directly to a location on the moving object. The accumulated values are read out along one edge of the pixel array. An image is reconstructed in (4) and displayed in (5).

22 Claims, 11 Drawing Sheets

(56) References Cited

U.S. PATENT DOCUMENTS

| | | |
|---|---|---|
| 4,369,458 A | 1/1983 | Thomas et al. |
| 4,513,312 A | 4/1985 | Takemura |
| 4,602,289 A | 7/1986 | Sekine |
| 4,609,823 A | 9/1986 | Berger et al. ............ 250/370.14 |
| 4,694,316 A | 9/1987 | Chabbal ....................... 257/231 |
| 4,744,057 A | 5/1988 | Descure et al. ............... 365/183 |
| 4,811,371 A | 3/1989 | Tower |
| 4,817,123 A | 3/1989 | Sones et al. ...................... 378/98 |
| 4,873,708 A | 10/1989 | Cusano et al. .................. 378/19 |
| 4,900,943 A | 2/1990 | Marshall et al. ........... 250/578.1 |
| 4,916,664 A | 4/1990 | Berger et al. ................. 365/183 |
| 4,945,243 A | 7/1990 | Arques |
| 4,947,258 A | 8/1990 | Hersh |
| 4,992,878 A | 2/1991 | Hersh |
| 5,012,247 A | 4/1991 | Dillman ........................ 341/172 |
| 5,043,582 A | 8/1991 | Cox et al. |
| 5,081,346 A | 1/1992 | Narabu et al. |
| 5,113,263 A | 5/1992 | Audaire et al. ........... 358/213.11 |
| 5,149,954 A | 9/1992 | Pettijohn et al. ........... 250/208.1 |
| 5,153,420 A | 10/1992 | Hack et al. |
| 5,168,528 A * | 12/1992 | Field, Jr. ....................... 382/103 |
| 5,182,624 A | 1/1993 | Tran et al. |
| 5,245,191 A | 9/1993 | Barber et al. |
| 5,291,402 A | 3/1994 | Pfoh |
| 5,315,114 A | 5/1994 | Kansy et al. .................. 250/332 |
| 5,315,147 A | 5/1994 | Solomon |
| 5,315,411 A | 5/1994 | Blanding |
| 5,379,336 A | 1/1995 | Kramer et al. |
| 5,401,952 A | 3/1995 | Sugawa |
| 5,402,168 A | 3/1995 | Fouilloy ........................ 348/164 |
| 5,475,212 A | 12/1995 | Nelson et al. |
| 5,526,394 A * | 6/1996 | Siczek et al. .................... 378/37 |
| 5,587,738 A | 12/1996 | Shinohara |
| 5,596,200 A | 1/1997 | Sharma et al. ........... 250/370.14 |
| 5,742,058 A * | 4/1998 | Pantigny et al. ......... 250/370.08 |
| 5,812,191 A | 9/1998 | Orava et al. ................... 348/308 |
| 5,917,881 A * | 6/1999 | Jeffery ......................... 378/98.8 |
| 5,937,326 A | 8/1999 | Cho |
| 5,998,777 A | 12/1999 | Audier et al. ............. 250/208.1 |
| 6,014,313 A | 1/2000 | Hesselbom |
| 6,035,013 A | 3/2000 | Orava et al. |
| 6,188,089 B1 | 2/2001 | Spartiotis |
| 6,248,990 B1 | 6/2001 | Pyythia et al. ............. 250/208.1 |
| 6,262,421 B1 | 7/2001 | Tran |
| 6,278,181 B1 | 8/2001 | Maley |
| 6,459,077 B1 | 10/2002 | Hynecek ....................... 250/208 |
| 6,563,539 B1 * | 5/2003 | Lefevre ........................ 348/295 |
| 6,645,787 B2 | 11/2003 | Nemirovsky et al. |
| 6,952,042 B2 | 10/2005 | Stratton et al. |
| 2002/0036269 A1 | 3/2002 | Shahar et al. |
| 2002/0130266 A1 | 9/2002 | Kyyhkynen |
| 2002/0180063 A1 | 12/2002 | Iwaki et al. |
| 2003/0155516 A1 | 8/2003 | Spartiotis et al. |
| 2004/0069213 A1 | 4/2004 | Bourgoin |

FOREIGN PATENT DOCUMENTS

| | | |
|---|---|---|
| EP | 0635892 A1 | 1/1995 |
| EP | 0 660 600 B1 | 3/1999 |
| EP | 1001469 A2 | 5/2000 |
| EP | 1063709 A2 | 12/2000 |
| EP | 1176814 A2 | 1/2002 |
| GB | 2 318 411 A | 4/1998 |
| GB | 2318411 A * | 4/1998 |
| GB | 2 323 736 | 9/1998 |
| GB | 2 343 577 A | 5/2000 |
| GB | 2343577 A * | 5/2000 |
| JP | 01200720 | 8/1989 |
| JP | 2002311146 | 10/2002 |
| WO | WO 98/16853 | 4/1998 |
| WO | WO 01/1486 A1 | 1/2001 |
| WO | WO 01/8224 A1 | 2/2001 |

* cited by examiner

IMAGING DEVICE

This application is a continuation of U.S. application Ser. No. 09/209829 filed on Dec. 11, 1998, now abandoned, that claims priority to Great Britain Patent Application No. 9824276.1 filed on Nov. 5, 1998.

FIELD OF INVENTION

This invention relates to an imaging device for scan-imaging radiation, and in particular, but not exclusively, to an imaging technique known as Time Delay Integration (TDI).

BACKGROUND TO INVENTION

Imaging devices comprising an array of pixels of various types are known and may or may not directly allow TDI mode of operation.

Charge coupled image sensors (also known as charge coupled devices (CCDs)) form one type of known imaging device. A CCD device operates in the following way.

1. Charge is accumulated in a depletion region created by an applied voltage. For each pixel the depletion has a potential well shape and constrains electrons under one electrode gate to remain within the semiconductor substrate.

2. Voltage is applied as pulse to the electrode gate of the CCD device to clock each charge to an adjacent cell. The charge remains inside the semiconductor substrate and is clocked through, pixel by pixel, to a common output. During this process no additional charge can be accumulated.

Another type of imaging device is the Active-pixel Semiconductor Imaging Device (ASID) described in International application publication number WO95/33332 and incorporated herein by reference. The ASID comprises an array of pixels including a semiconductor substrate having an array of detector cells and a further array of pixel circuits. The detector cells generate charge in response to incident radiation. Each pixel circuit associated with a respective detector cell accumulates charge resulting from plural radiation hits of the associated detector cell. At determined times the charge from the pixel circuits can be read out and used to generate an image based on the analogue charge values stored in each pixel circuit.

A further type of imaging devices are photon counting devices (PCD) described in International application publication number WO98/16853 and incorporated herein by reference. The PCD comprises an array of pixels including a semiconductor substrate having an array of detector cells and a further array of pixel circuits. The detector cells generate charge in response to incident radiation. Each pixel circuit comprises a discriminator registering radiation hits of a preferred energy range for a respective detector cell, and an n-bit digital counter and an n-bit loadable shift-register.

The PCD works in the following way.

1. The number of registered radiation hits in the associated detector cell is counted into the n-bit digital counter.

2. In response to an external request the value of the counter is loaded into the n-bit shift-register and the value of the counter is cleared.

3. All shift-registers of the entire sensor are chained and the information is clocked out in a serial fashion. Steps 1 and 3 can be executed simultaneously.

Of the afore-mentioned imaging techniques only CCD devices have been used in a TDI mode of operation since charge-shifting is an inherent feature of CCD technology.

Referring to FIG. 9, there will now be described a TDI CCD detector and the operation of such a detector.

Since CCDs are sensitive only to visible light, a scintillator 80, such as a phosphor, for converting high energy radiation, such as X-rays 82, into visible light must be placed in front of the CCD device 84. The scintillator 80 is generally composed of a strip of phosphor material, and is coupled to a fibre optic taper 86, which is bonded to the active region 88 of the CCD device 84. Three fibre optic tapers 86 respectively bonded to three CCD devices 84 are illustrated in FIG. 9. The fibre optic tapers 86 de-magnify light collection to provide space at the taper outputs to accommodate the outer non-active regions of the CCD devices 84, yet still maintain an acceptable light collection efficiency.

In a TDI mode, image acquisition takes place by scanning a continuously active X-ray beam across an object, such as a breast for mammography applications, and correspondingly moving the detector across the object, typically at the same scanning speed as the X-ray beam. Charge collected in CCD pixels is shifted down the columns of the CCD devices 84 at a rate equal to, but in an opposite direction to, the scanning X-ray beam. The charge packets collected at the end of the CCD columns have effectively remained stationary with respect to a given path of X-rays through the object, and they comprise the integral of several charge packets in the CCD column. This is because the sensor remains active at all times and the total pixel charge on the image comes from integrating charge from multiple pixel cells as the total charge is clocked along one column. The collected charge packets are read out and typically digitised for processing into suitable images.

TDI mode imaging advantageously provides good total energy levels of imaging radiation and correspondingly good stability, yet from relatively low overall X-ray illumination. Thus, providing good imaging whilst reducing the inherent danger from high power X-ray illumination.

However, CCD imagers require indirect conversion of X-rays to light, and thus have limited absolute sensitivity and resolution. Direct radiation to electron converting substrates cannot be connected to a CCD because the small pixel charge capacity of CCDs saturates at very low doses of radiation, and cannot cope with the large currents provided by direct conversion.

The present invention seeks to mitigate the problems described in the prior art and embodiments provide a TDI imaging device not using a CCD.

SUMMARY OF INVENTION

In accordance with a first aspect of the invention there is provided an imaging device for scan-imaging in a Time Delay Integration (TDI) mode comprising an image cell array including an array of detector cells for generating charge in response to incident radiation and a corresponding array of pixel circuits comprising accumulation circuitry for accumulating pixel image values corresponding to incident radiation, each pixel circuit being associated with a respective detector cell and controllable to transfer a pixel image value to an adjacent pixel circuit.

Preferred embodiments of the invention provide for TDI mode imaging using detectors other than CCD devices, thereby avoiding the inherent drawbacks of such devices.

The pixel circuit is typically operable to receive a pixel image value from an adjacent (preceding) pixel circuit, which is loaded into the accumulation circuitry. The accumulation circuitry modifies, typically increases, the loaded pixel image value in accordance with radiation incident on said detector.

In a preferred embodiment the pixel circuit comprises transfer circuitry responsive to a control signal to transfer a pixel image value to a succeeding pixel circuit and to load a pixel image value from a preceding pixel circuit. Thus pixel image values representing radiation incident from a corresponding pixel element of an illuminated object can be accumulated and transferred along the pixel cell array, in order to track radiation originating from that pixel element.

Preferably, the signal is a charge packet and the accumulation circuitry comprises a charge collector such as a capacitor coupled to the detector. The capacitor may be a CMOS capacitor, for example associated with an FET. Such a configuration advantageously utilises the circuit technology and elements of the pixel circuits, without requiring special components.

Preferably, the transfer circuitry includes a second charge collector which receives a charge packet from the first charge collector during transfer of charge to a succeeding pixel circuit. Charge transfer is typically accomplished in at least two steps using both charge collectors in each step. The level of charge transferred is determined by a reference voltage below which the charge on the first or second charge collector cannot fall. The reference voltage is generally internally generated, and can be a gate threshold voltage for example.

Suitably, the transfer circuitry comprises first and second switch means, typically transistors such as FETs or the like, respectively associated with the first and second charge collection means. The switch means are operated in anti-phase to transfer charge from first and second charge collection means, and to an adjacent pixel circuit in a sequence of steps.

Typically, the accumulation circuitry is coupleable to a second charge collection means of a preceding pixel circuit for receiving and accumulating charge from said preceding pixel circuit, and the second charge collection means is coupleable to accumulation circuitry of a succeeding pixel circuit.

Optionally, in a preferred embodiment of the invention the accumulation circuitry comprises counting circuitry for counting plural radiation hits incident on an associated detector cell, and the pixel image value comprises a count value. Such an embodiment provides for the use of photon counting devices in TDI mode imaging.

Preferably, the accumulation circuitry further comprises threshold circuitry coupled to receive signals generated in said associated detector cell and having values dependent on instant radiation energy, said counting circuitry being coupled to said threshold circuitry for counting radiation hits within a predetermined energy range or ranges.

More preferably, the transfer circuitry comprises a loadable register coupled to said counting circuitry for receiving a count value therefrom, and further couplable to respective loadable registers associated with said succeeding and preceding pixel circuits for receiving and forwarding count values to and from said succeeding and preceding circuits respectively. Typically, the loadable register is a shift register.

Advantageously, the counting circuitry and loadable register comprise logic circuitry configured as a unitary element operable as the counting circuitry and the loadable register, which takes up less area on the pixel circuit substrate.

In a second aspect of the invention a preferred embodiment comprises a scanning imaging system comprising an imaging device as described above, control electronics for reading image information from said imaging device and processing said imaging information for display, and display means for displaying said processed information. Suitably, the system comprises support means for said imaging device and said high energy radiation source and adapted to move said imaging device and high energy radiation source relative to an object disposed between said imaging device and high energy radiation source. Optionally, the object may move relative to the radiation source and imaging device.

In a third aspect of the invention there is provided a method for operating an image cell array including an array of detector cells for generating charge in response to incident radiation and a corresponding array of pixel circuits comprising accumulation circuitry for accumulating pixel image values corresponding to incident radiation, each pixel circuit being associated with a respective detector cell and controllable to transfer a pixel image value to an adjacent pixel circuit, the method comprising receiving and transforming pixel image values from and to adjacent pixel circuits.

Suitably, the pixel image value is a charge packet.

In a preferred embodiment the method comprises electrically isolating a first charge collection means from a second charge collection means whilst receiving charge from a preceding pixel circuit and transferring accumulated charge to a succeeding pixel circuit, and subsequently electrically isolating the first and second charge collections means from the preceding and succeeding pixel circuits respectively and electrically coupling the first and second charge collection means for transferring accumulated charge therebetween.

Optionally, the method is for operating an imaging device wherein the accumulation circuitry comprises counting circuitry for counting plural radiation hits incident on the associated detector cell and the pixel image value comprises a count value, the method further comprising determining the charge from the detector fulfilling a predetermined criterion and correspondingly triggering the counting circuitry, for counting radiation hits within a predetermined energy range or ranges.

DETAILED DESCRIPTION

Figure 1:
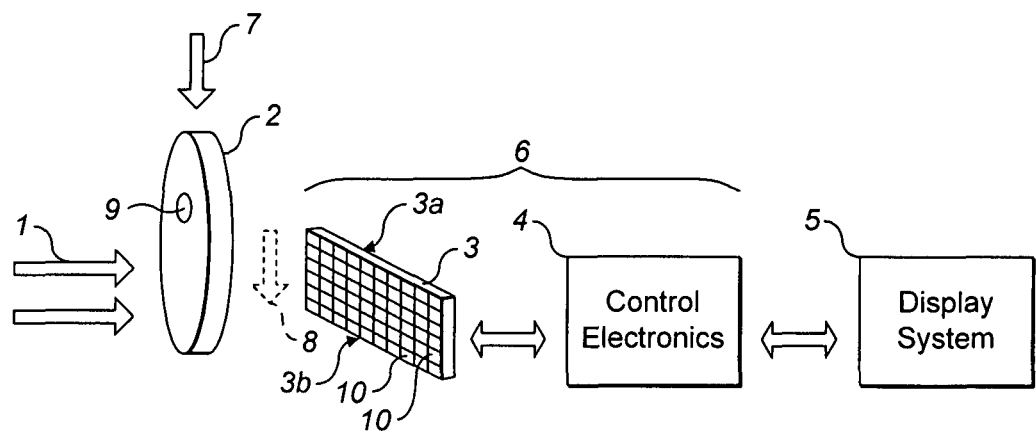
FIG. 1 is a schematic block diagram of an overall scan-imaging system configuration.

Exemplary embodiments of the invention will be described hereinafter, by way of example only, with reference to the accompanying drawings in which like elements have like numbers.

Embodiments of the invention may use analogue (charge) accumulation and transfer when implemented with ASID pixel circuits, and alternatively digital (photon count) accumulation and transfer when implemented with PCD pixel circuits. Both types of pixel circuits can be integrated using a standard wafer process (e.g. CMOS, NMOS, BICMOS) as well as future wafer processes.

In an analogue implementation, the pixel circuit comprises two capacitors, the first capacitor being connected to a respective detector cell. The pixel charge transfer employs additional circuitry whereby charge from the preceding pixel circuit enters into the first capacitor and leaves the cell from the second capacitor as part of an accumulated charge packet.

The charge transfer is controlled by a single clock signal. Both capacitors with respective control circuitry form two similar stages controlled by complementary clock signals making one active and one inactive. Together with the preceding and succeeding cell circuits a chain of active and inactive stages is formed e.g. along one column.

Charge transfer is realised by creating a voltage difference between two stages allowing current to flow from an active to an inactive stage and by precisely switching off the current flow as a reference voltage on the capacitor of the inactive stage is reached.

From special cells at the end of the chains (e.g., columns) the charge can be read out and used to reconstruct an image based on the charge values accumulated.

In an alternative digital implementation the pixel cell circuit comprises a discriminator responding with a pulse to a radiation hit of a desired energy threshold or range in the respective detector cell, an n-bit counter and an n-bit shift register. The inputs and outputs of the shift register are connected to the preceding and succeeding pixel circuit respectively forming a chain e.g. along one column. The counter and shift register can load in parallel from each other upon controls signals.

The TDI mode of operation in an array consisting of such cells can work in the following way:

1. Count values corresponding to radiation hits of the desired energy incident on the associated detector cell get added to the content of the counter.

2. The shift register loads the value from the counter and serial shifts it into the register of the succeeding cell circuit.

3. The counter is loaded with a value from a preceding cell circuit from the shift register.

During Step 2 and 3 no radiation hits can be registered, thus, the pixel is inactive but the ratio of inactive to active time may be better than 1 to 100.

From the last pixel circuit in a column the value can be read out and used to generate an image based on counted photons.

A more detailed description of embodiments of the invention will now be described.

FIG. 1 is a schematic block diagram of one example of a scan-imaging system using an imaging device 6 in accordance with an embodiment of the present invention. This particular example is directed to the imaging of high energy radiation, e.g., X-ray radiation. However, it will be clear to persons of ordinary skill in the art that other radiation such as gamma radiation, alpha radiation or beta radiation for example may be used.

The imaging system of FIG. 1 is shown to provide imaging of an object 2 moving at scanning speed $V_{OPT}$ 7 with respect to the pixel array 3 and subjected to radiation 1. The system of FIG. 1 is shown with a moving object 2 in order to simplify and aid the clarity of the description of embodiments of the invention. Conventionally, the object, particularly, if it is part of the human body, is static and the X-ray source and detector move relative to the object. Persons of ordinary skill in art will readily understand the principles described hereinafter and can adapt them for static objects. In this example the radiation 1 is X-ray radiation and the object 2 part of a human body. The pixel array 3 comprises a plurality of pixels 10 arranged in two dimensions. However, it will be appreciated that other embodiments may have a different configuration (e.g., a strip arrangement).

Conceptually, a region of the object 2 may be considered to be a pixel element 9. Radiation impinging on pixel element 9 irradiates an area of pixel 3 corresponding to a pixel. As the object 2 moves relative to the pixel array 3 so the radiation corresponding to pixel element 9 impinges on succeeding pixels The imaging device directly detects incident X-ray radiation and accumulates at each pixel a pixel image value representing incident radiation from a corresponding pixel element 9 which moves from pixel to pixel cell 10, e.g., in a row by row fashion, with a speed $V_{TDI}$ 8 which may be the same as $V_{OPT}$. The pixel image value starts with a value zero at the side 3a of the pixel array where the moving object 2 enters the field of view of the pixel array 3, and is read out after it reaches the opposing side 3b of the pixel array 3 where the object leaves the field of view. As a pixel image value moves through the pixel array 3 it accumulates a plurality a radiation hits corresponding to one point of interest on the moving object 2 rather than to one pixel on the pixel array.

Figure 2:
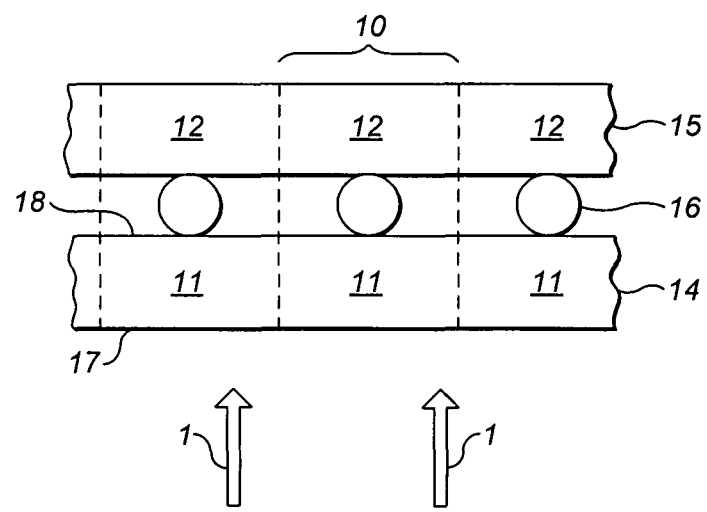
FIG. 2 is a cross-section of one example of a pixel array.

Referring now to FIG. 2, the pixel array 3 can be configured on a single semiconductor substrate (e.g. Silicon) with each pixel cell 10 comprising a detector cell 11 and a pixel circuit 12. Alternatively, the pixel array 3 can be configured on two substrates, one with an array of detector cells and one with an array of corresponding pixel circuits, the substrates being mechanically and electrically connected by, for example, conventional bump-bonding technology or any other appropriate technology.

FIG. 2 shows a schematic cross-section of part of a pixel array 3. In this example, the pixel array 3 comprises a detector substrate 14 connected to a circuit substrate 15 by means of bump-bonds 16. A detector cell 11 of each pixel 10 is defined on the detector substrate 14 by a continuous electrode 17 which applies a biasing voltage and pixel location electrodes 18 to define a detection zone for the pixel 10. Corresponding pixel circuits 12 are electronically connected to the corresponding electrodes 18 by bump-bonds 16. In this manner, when charge is generated in a detector cell 11 in response to incident radiation 1, the charge is passed via bump-bond 16 to the corresponding pixel circuit 12.

The actual size of the pixel cell will depend on the application for which the imaging device is intended, and will also depend on the integrated circuit technology available for constructing the pixel circuit 12 to be described later. With current technology, it is not possible to obtain the smallest possible pixel cell sizes which would be required in some applications. Typically, the minimum pixel cell size is of the order 100 µm square using current technology which is suitable for most diagnostic and dental imaging applications. However, with advances expected in circuit manufacturing technology it is expected that the minimum size can be significantly reduced.

Accordingly, the present invention is not limited to any particular pixel cell size.

Any appropriate semiconductor material can be used for the substrates. For example, silicon may be used for the detector substrate and for the circuit substrate. Other materials could be used, e.g. the detector material could be selected from: CdZnTe, CdTe, $HgI_2$, InSb, GaAs, Ge, TlBr, Si and $PbI_2$. The detector substrate need not be limited to direct conversion materials, but could comprise CMOS circuits, on a silicon substrate, and comprising photo-diodes for receiving light from a scintillator. Optionally, amorphous silicon can be used in conjunction with a scintillator screen and pixel circuitry including an active pixel circuit 12 as described hereinafter with reference to FIG. 10.

Figure 3:
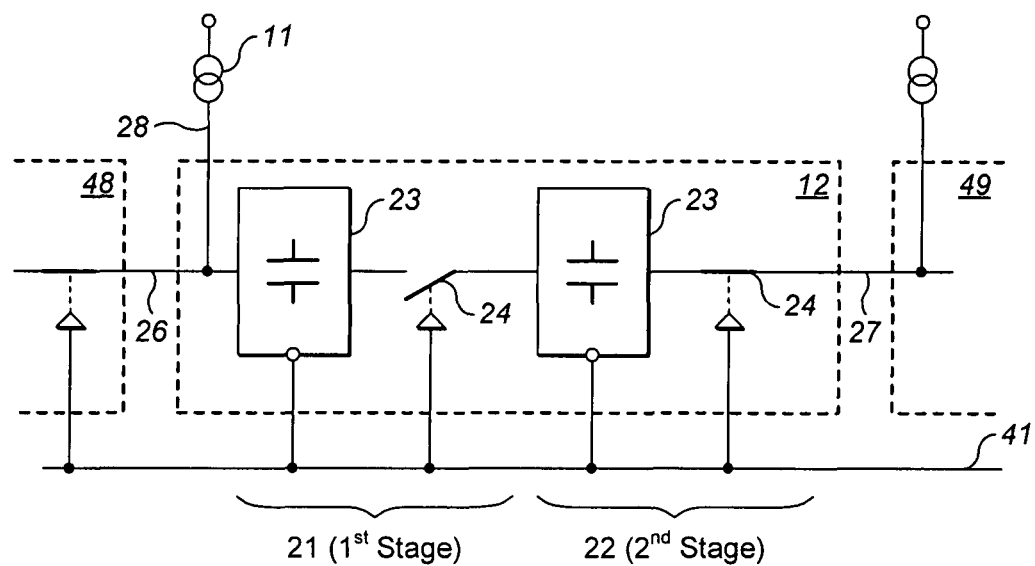
FIG. 3 is a schematic block diagram of an analogue implementation of a pixel circuit of the imaging device in FIG. 2.

FIG. 3 is a schematic block diagram of an individual pixel circuit 12 in accordance with a first embodiment of the invention using analogue circuitry. The detector cell 11 is schematically represented by a radiation controlled current source in FIG. 3. The input 28 to the pixel circuit 12 corresponds to the bump-bonding connection between the detector cell 11 and the pixel circuit 12. A further input 26 and an output 27 furnish connections to previous 48 and succeeding 49 adjacent pixel cell circuits. Charge can be exchanged between adjacent circuits in order to provide accumulated charge packet transfer from pixel cell to pixel cell.

When a photon is photo-absorbed in the detection zone of detector cell 11 creating electrical charge, or when a radiation particle ionises a detection zone of detector cell 11, an electric charge flows into the pixel circuit 12 through input 28. The detector charge is summed with any incoming charge from the preceding pixel circuit 48 entering through input 26. The combined charge can leave the cell through output 27 and enter the succeeding pixel circuit 49.

Each pixel circuit includes two similar series connected stages 21 and 22, comprising charge storing circuitry 23 and a switch 24 at the output of the stage, which although shown here separately can form a part of the charge storing circuitry 23. The switch is typically a semiconductor switch such as an FET for example. Charge passes through both stages under the control of a clock signal 41 which closes and opens the switches 24 of stages 21 and stage 22 mutually exclusively, or in anti-phases, and also activates and deactivates the stages respectively. Thus, a packet of charge is preceded and followed by a closed switch separating charge packages from each other.

The pixel circuit functions as follows.

1) In clock state 0 for clock signal 41 the switches 24 are in the states as shown, and charge from the preceding pixel circuit 48 together with charge from the detector cell 11 enters stage 21 where it is accumulated and summed. Charge on stage 22 belongs to the previous packet and is completely transferred to the succeeding pixel circuit 49 over output line 27.

2) In clock state 1 for clock signal 41 all switches 24 are in the opposite state to that shown in FIG. 3 and charge does not enter or leave pixel circuit 12, instead all accumulated charge plus the charge still arriving from the detector cell 11 is transferred to stage 22.

Figure 4:
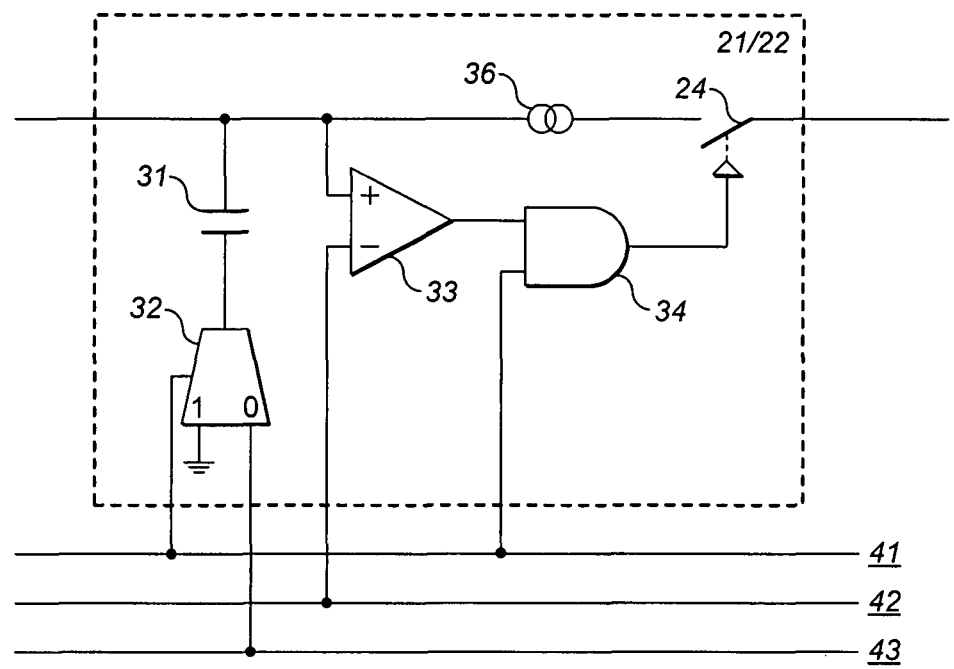
FIG. 4 is an example circuit of one stage of the pixel circuit of FIG. 3.

FIG. 4 shows a schematic circuit diagram for an implementation of stage 21 or 22 of FIG. 3. The circuit comprises a capacitor 31 which is able to store the maximum expected pixel charge, and circuitry to manage the transfer of charge. One side of the capacitor 31 is connected to a clock controlled multiplexer 32 for switching between ground and a constant electrical potential 43 for transferring charge between two capacitors in the form of an electrical current.

The switch 24 is also controlled by the AND-gate 34, as well as clock signal 41, which closes the switch 24 at clock state 1 of clock signal 41 only if the comparison of the capacitor voltage and the reference potential 42 shows that the capacitor voltage is greater than the reference potential. Thus, only exactly the charge needed to reach reference potential on the capacitor is allowed to leave through the output.

As shown, the circuitry of FIG. 4 operates as stage 21 shown in FIG. 3. However, if the clock inputs of the AND-gate 34 and the multiplexer 32 are inverted, the circuitry shown in FIG. 4 works as stage 22 shown in FIG. 3. Depending on the type of detector substrate and the required biasing voltage, the detector produces charge or discharge whereby the input polarity of the comparator 33 has to be as shown or inverted, respectively. Also, the constant potential 43 has to be smaller or greater than the reference 42, respectively.

The current source 36 is included in the schematic diagram shown in FIG. 4 to limit the current which flows during the charge transfer and make it independent from voltage drop and parasitic resistance. Therefore, the electrical potential on the capacitor 31 changes linearly improving the performance of the comparator 33. In practice, the current limitations can be provided by saturation of the switch 24.

Figure 5:
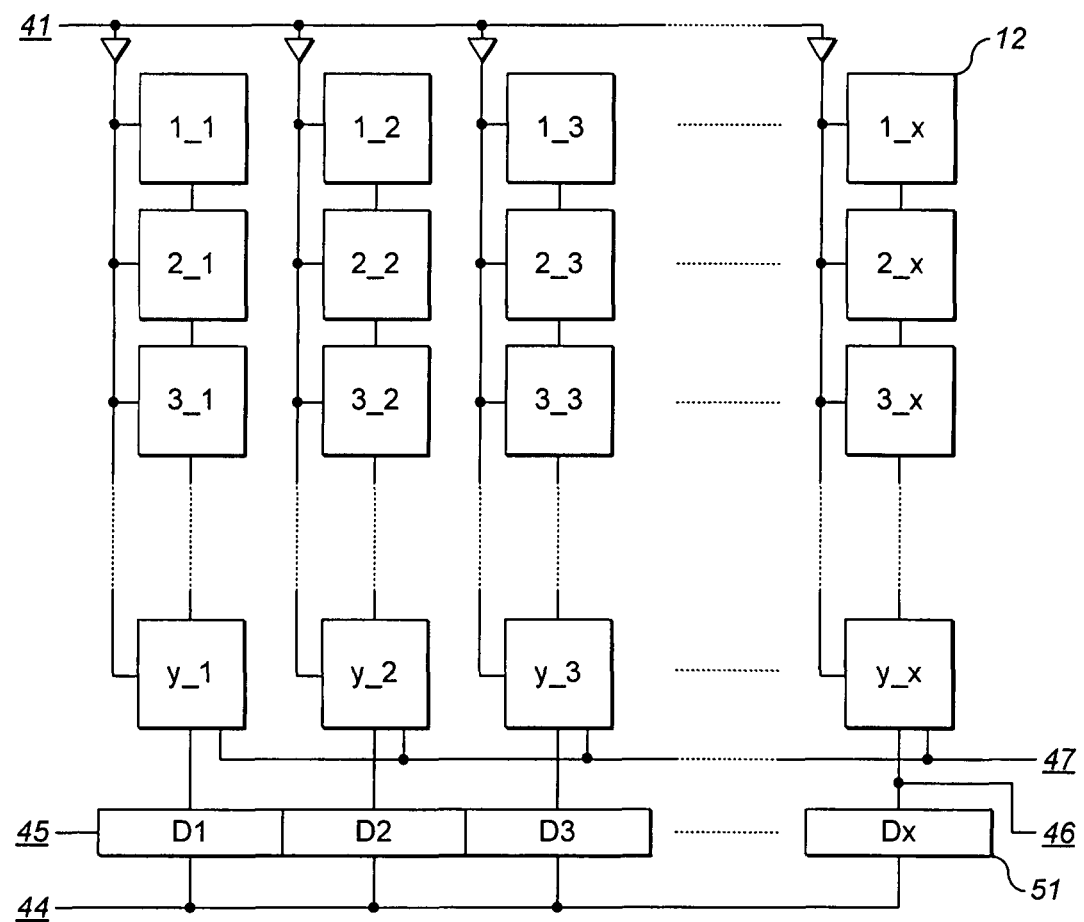
FIG. 5 is a readout configuration of an array of analogue pixel circuits.

FIG. 5 is a schematic illustration of an x by y pixel array 3 consisting of pixel circuits as described with reference to FIG. 3, although not limited to such circuits. Cells of the $y^{th}$ and final row are different from the other cell circuits as that they have circuitry to read out the pixel value to a common output line 47 in response to a control 110 signal which provided by a shift (address) register 51. The address register 51 is controlled by the readout clock 44 which has to be sufficiently faster than the transfer clock 41 to shift pixel values of the $y^{th}$ row out before a next update of the $y^{th}$ row. That is to say, the readout clock must have a frequency at least 2y times great than the transfer clock 41. The readout cycle is started by an impulse of one readout clock cycle on input 45 and a similar impulse on the output 46 marks the end of the readout cycle.

Charge is accumulated and integrated at each pixel circuit location as the object 2 moves relative to the pixel array 3, and charge packets move down the array columns tracking their respective pixel element of the object 2. Eventually, the charge packets reach the $y^{th}$ row, where they are readout before the $y^{th}$ row is updated with the next accumulated charge packet.

Figure 6:
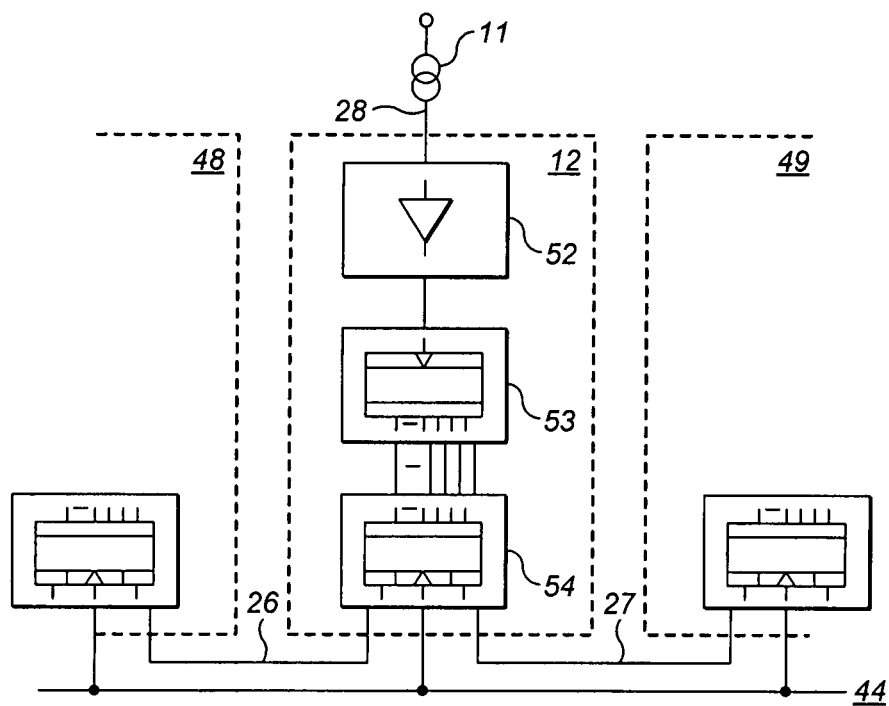
FIG. 6 is a schematic block diagram of a digital implementation of a pixel circuit of the imaging device in FIG. 2.

FIG. 6 is a schematic illustration of a block diagram for an alternative, digital, embodiment of a pixel circuit 12 of the imaging device in FIG. 2. The pixel circuit 12 comprising a discriminator 52, an n-bit counter 53 and a n-bit shift register 54 providing a serial connection to a preceding 48 and succeeding 49 pixel circuit. The detector 11 is shown simplified as a radiation controlled current source.

When a photon is photo-absorbed in the detection zone of the detector cell 11 creating electrical charge, or when particle radiation ionises a detection zone of the detector cell 11, an electric charge flows into the pixel circuit through input 28. In response to a radiation hit of the desired energy range (e.g., excluding scattered radiation) the discriminator 52 produces a single pulse to be added to the value in the counter 53. The counter value is representative of pixel luminance or radiation energy incident for that pixel.

Referring to FIG. 6, under the control of control signals (not shown) the shift register 54 is loaded in parallel with the value from the counter 53. By applying n clock cycles via the clock signal 44 the count value is serial shifted to the succeeding pixel circuit 49 over connection 27. A following control impulse loads a count value, shifted into register 54 from the preceding circuit 48, into the counter 53 and new radiation hits are accumulated and added to the value in the counter 53. For the time of the transfer cycle, i.e. transfer of count value from preceding and to succeeding circuits, the detector is inactive However, the active time may be more than 100 times greater than the transfer time and thus the inactive period does not significantly adversely affect the operation of the detector.

The implementation of the loadable counter 53 and the loadable shift register 54 in each pixel circuit requires a considerable amount of semiconductor area. Therefore, a more efficient alternative is now described with reference to FIG. 7.

Figure 7:
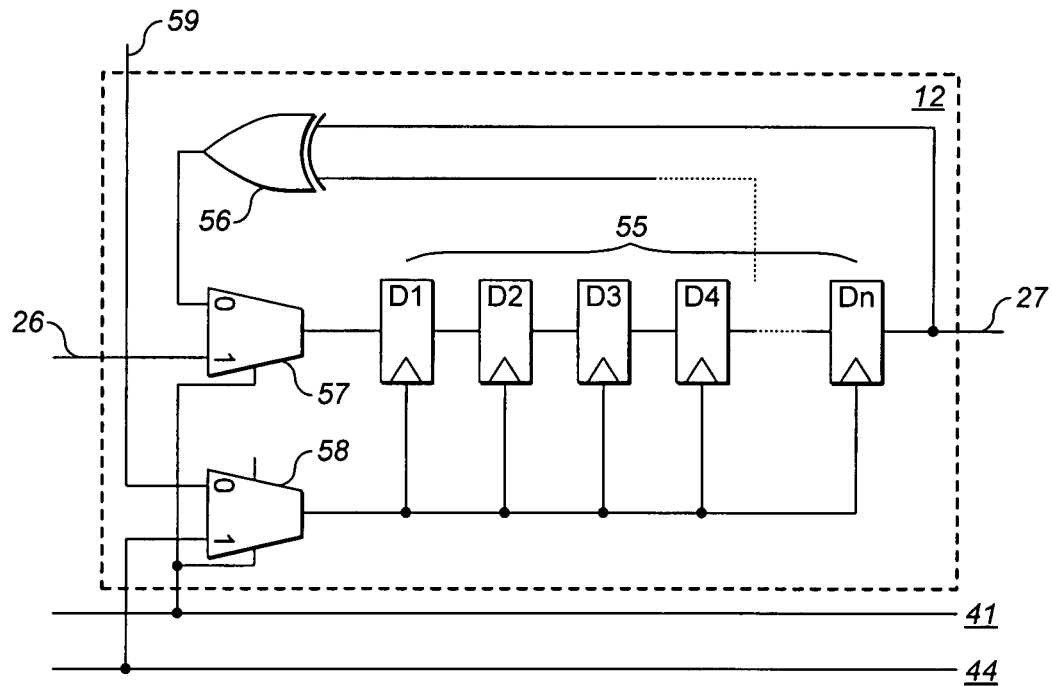
FIG. 7 is an alternative example of the counter/shift register circuitry of the pixel circuit of FIG. 6.

FIG. 7 shows a further embodiment implementing a counter and shift register with only an n-bit shift register 55 shown in FIG. 7 comprising n D type flip-flops, two multiplexers (57 and 58) and one XOR-gate 56 with 2 or more inputs. The circuitry shown in FIG. 7 functions as follows.

1) When the control signal 41 is at state 0 the input of the shift register 55 is an XOR combination of 2 or more flip-flop states (tabs of the shift register 55) and where the discriminator signal 59 output from discriminator 52 provides the clocking signal. In this configuration, the shift register 55 works as a pseudo-random number generator in which up to $2^n-1$ different combinations ($2^n$ for a binary counter) of the register value are possible dependent on the position of the tabs.

2) When the control signal 41 is at state 1 the input of the shift register 55 of pixel circuit 12 is connected to the output 26 of the shift register of the preceding pixel circuit 48, and all registers are clocked by the clock signal 44. The control signal 41 stays 1 for n clock periods of the clock signal 44 ensuring complete transfer of the counter value to the next pixel circuit. Evidently, the shift register 55 cannot be updated by discriminator signal 59 during transfer of count values from and to respective preceding 48 and succeeding 49 pixel circuits.

Figure 8:
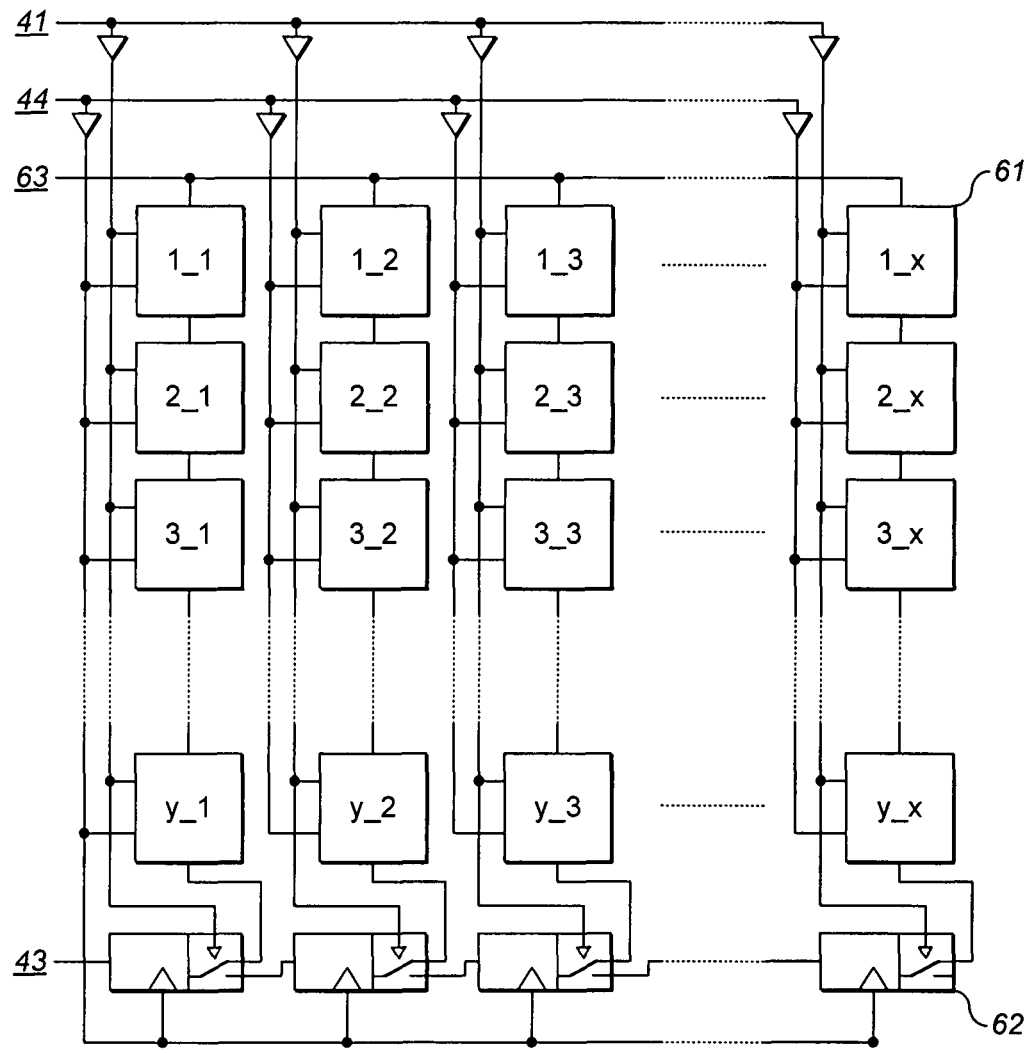
FIG. 8 is a readout configuration of an array of digital pixel circuits.
Figure 9:
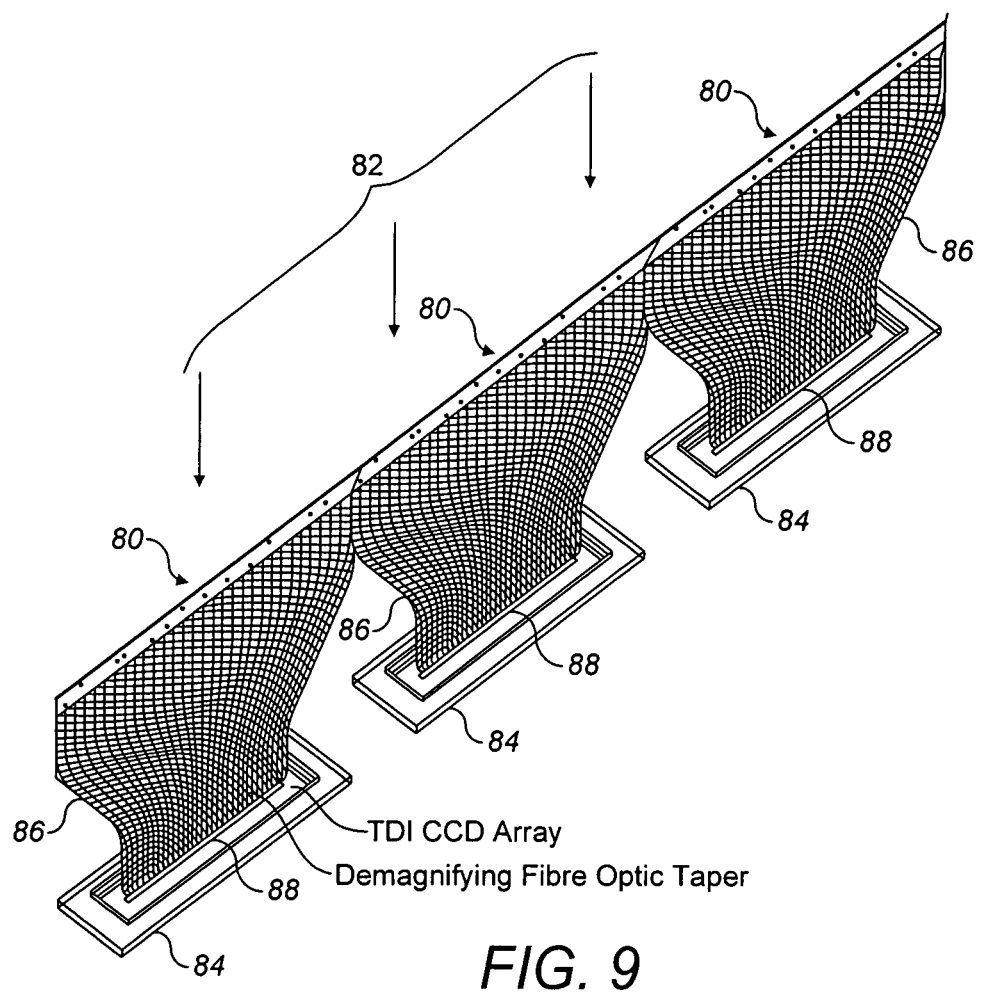
FIG. 9 is a schematic illustration of a conventional TDI CCD detector.

FIG. 8 is a schematic illustration of an x by y array of digital pixel circuits. If binary counters are used in the pixel circuits then the inputs of the first row of pixel circuits 1_1 . . . 1_n (signal 63) are connected to logical 0 to provide an initial counter value of 0. If the counter described with reference to circuit as FIG. 7 is used, the input is a logical 1 giving an initial counter value of 111 . . . 1 since a starting value of 0 would dead lock the pseudo random number generator used as a counter in the circuitry illustrated in FIG. 7.

The outputs of the pixel circuits m_1...m_n in the last row are of the array of FIG. 8 are connected to an n-bit shift register 62 which that no transfer from the pixel cells between rows occur is connected in series over the entire row to serial shift out the all row values in the last through line 61 out of the pixel array, during the time period.

Figure 10:
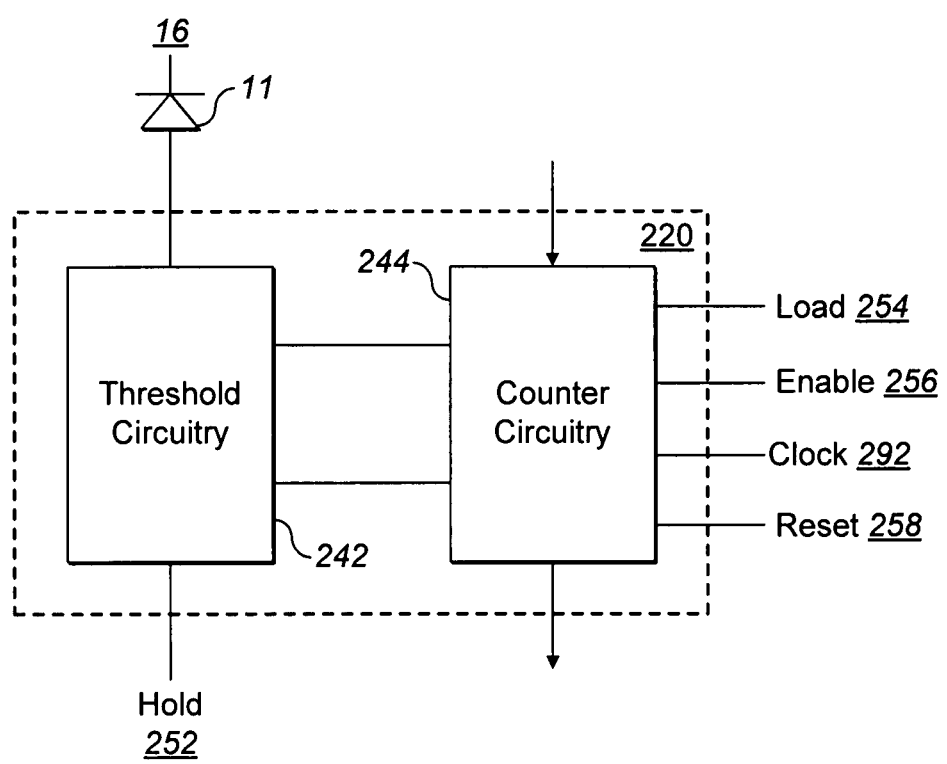
FIG. 10 is a schematic illustration of an implementation of circuitry for counting plural radiation hits.

Referring now to FIG. 10 there is illustrated is a diagram of an individual pixel circuit 220 suitable for implementing the counter 53 of FIG. 6. The pixel detector is represented by the diode 11 in FIG. 6. The threshold circuitry 242 effectively filters input radiation intensity by comparing the input pulse peak to one or more threshold values. The output of the threshold circuitry 242 is connected to counter circuitry 244 for counting pulses (radiation hits) within one or more predetermined ranges as defined by the threshold circuitry. The counter circuitry is connected to the shift register 54 and the shift registers of other adjacent pixel circuits for readout and count transfer purposes. Various inputs to the pixel circuit 220 include hold 252, load 254, enable 256, reset 258 and clock 292 signal lines and voltage supply lines Vdd and Vss (not shown).

Figure 11:
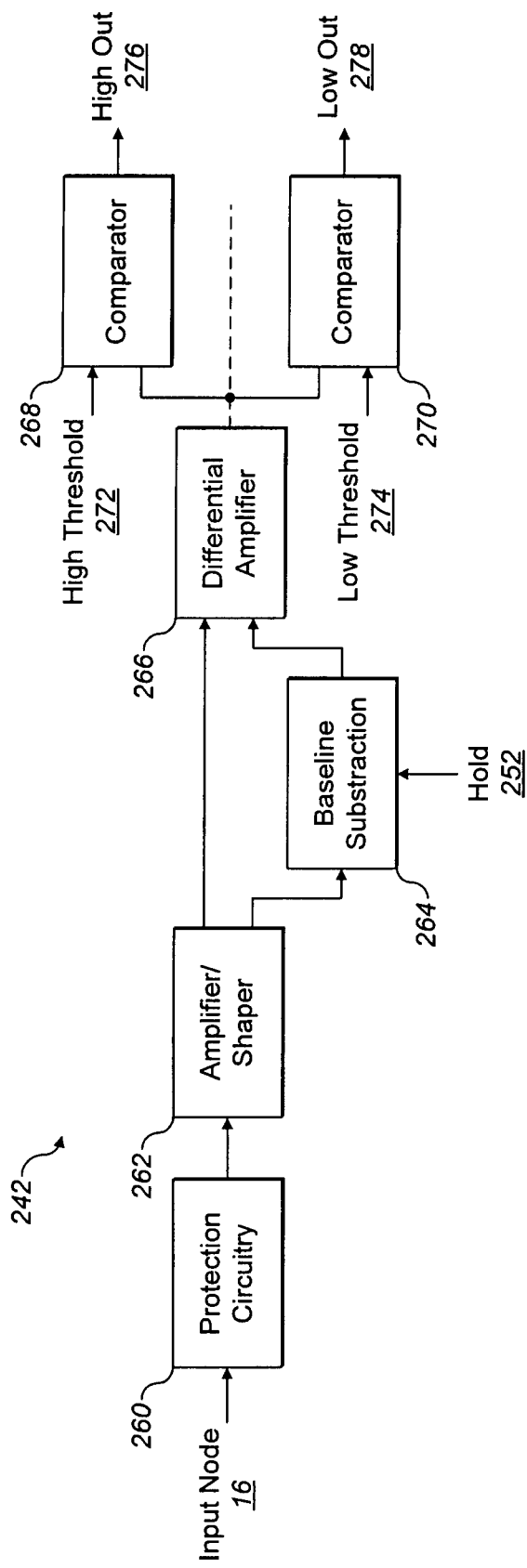
FIG. 11 is a more detailed schematic illustration of the counting circuitry shown in FIG. 10.

FIG. 11 is a schematic block diagram of the threshold circuitry 242 represented in FIG. 10. As shown in FIG. 11, protection circuitry 260 is connected to the input node 16 (i.e. the bump-bond connection to the pixel detector). The protection circuitry is provided to prevent damage due to over-or-under-voltage values and is typically provided by two diodes connected to the high and low supply line Vdd and Vss (not shown). The output of the protection circuitry 260 is connected to amplifier/shaper circuitry 262 which produces an analogue signal proportional to the charge injection of a delta peak. Preferably the amplifier shaper 262 is implemented by means of a charge sensitive amplifier followed by a shaper. The shaping time depends on the maximum signal rate on a pixel. FIG. 11 illustrates optional baseline subtraction circuitry 264 which is needed if the leakage current varies significantly within the selected shaping time. Optionally, one can select the time when the baseline is sampled. In this case, the baseline is sampled outside normal measurement times.

A differential amplifier 266 subtracts the baseline so that comparators 268 and 270 see the true peak signal height. First and second comparators 268 and 270 have respective high and low threshold values 272 and 274 input thereto. The high and low threshold values can represent higher and lower limits of accepted signal amplitudes. In this case any signal peaks below the low threshold and above the high threshold will be rejected by the counter circuitry 244. If the peak signal value exceeds the high threshold value 272, then the first comparator 268 outputs a logic 1, otherwise it outputs a logic 0.

Similarly, if the peak signal value exceeds the low threshold value 274, then the second comparator 270 outputs a logic 1, otherwise it outputs a logic 0. It will be appreciated that the comparison output values of the present embodiment form one example only and in other embodiments of the invention other values could be output as a result of the comparisons.

Figure 12A:
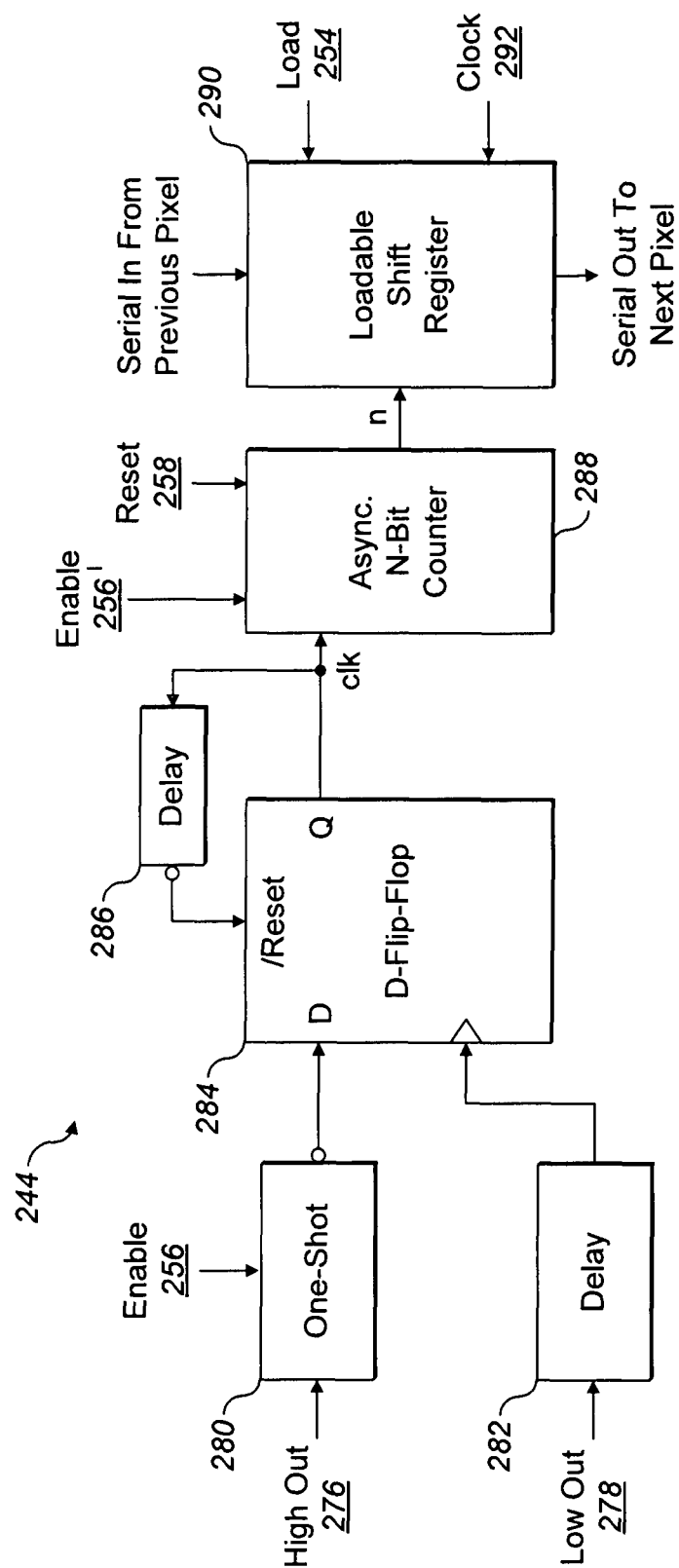
FIG. 12*a*-12*b* are schematic illustrations of circuitry for counting radiation hits within a predetermined energy range.
Figure 12B:
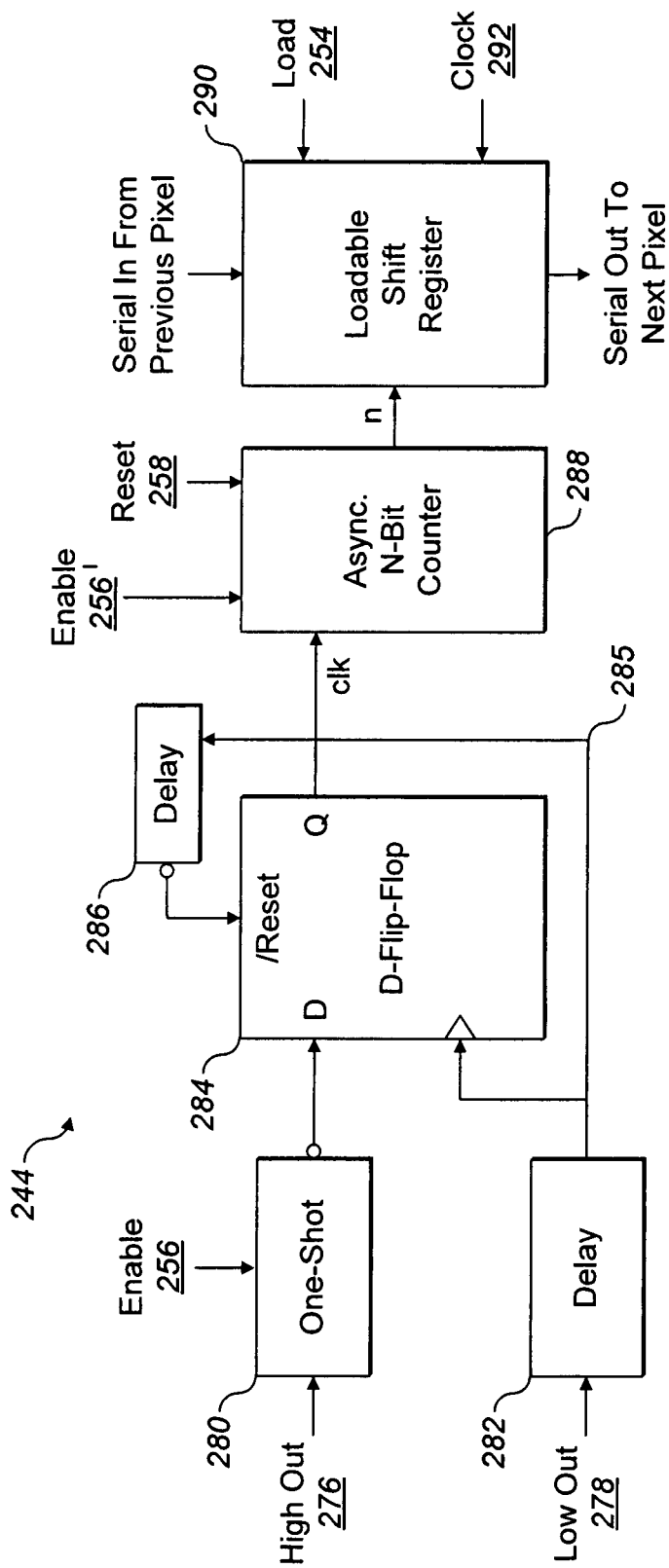

FIGS. 12a and 12b are schematic block diagrams of a first example of counter circuitry 244. Depending on the shaping parameters and signal amplitudes, the high output signal 276 from the first comparator 268 always comes some time later than the low output 278 from the second comparator 270. In FIG. 12a, the high output 276 from the first comparator 268 is supplied to a one shot circuit 280 which is responsive to the enable signal 256. The low output 278 from the second comparator 270 is supplied to a delay circuit 282. By applying a delay to the low output 278, the order of the signals 276 and 278 can be reversed so that the signal received from the delay circuit 282 at the clock input C of a D-flip-flop 284 always comes later than the inverted output of the one-shot circuit 280 which is supplied to the D input of the flip-flop 284. If the high threshold 272 was not exceeded by the input signal, the output Q of the flip-flop 284 will be set high. The output Q of the flip-flop 284 is connected via a delay 286 to a reset input RESET of the flip-flop 284 to cause the flip-flop to be reset after a delay D2 to ensure a minimum pulse length for the output "clk" signal from the Q output of the flip-flop 284. An alternative to feeding back the output Q to the delay 286 is represented in FIG. 12b by line 285 from the delay circuit 282. Although a D-flip-flop 284 is shown in FIGS. 12a and 12b, another type of flip-flop could be used.

The length of the single-triggered one-shot circuit 280 is adequate to coincide with the rising edge from the low output signal 278 from the second comparator 270 at all signals amplitudes.

The output "clk" from the output Q of the flip-flop 284 is provided as an input to an asynchronous n-bit counter 288. According to the type of counter used, counting can be disabled with an enable signal 256 before latching an n-bit output from the counter 288 to a loadable shift register 290. The counter 288 can then be reset and the counter 288 can be enabled to proceed with counting. Reading from the pixel circuit can then be effected during the next counting period in response to the clock signal 292.

The overall operation of the triggered counter arrangements shown in FIGS. 12a and 12b is to cause a count to be accumulated in the counter 288 on each occasion that a signal is received in response to a radiation hit having an energy between the high and low threshold values 272 and 274.

Figure 13:
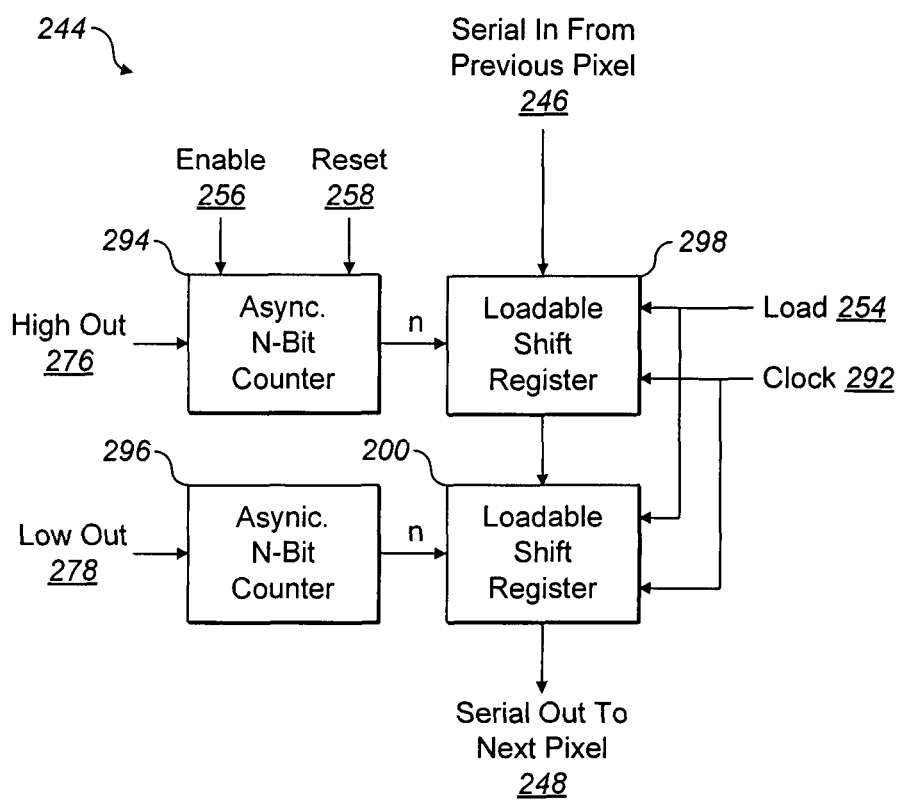
FIG. 13 is a schematic illustration of further circuitry for counting radiation hits within a predetermined energy range.

An alternative arrangement for the counter circuitry is illustrated in FIG. 13. In the alternative counter circuitry shown in FIG. 13, both low and high output counts are directly obtained. This circuitry requires more circuit real estate and readout time then the circuitry of FIG. 11, but it does allow a direct readout of the number of counts between the thresholds by subtracting the low count from the high count and also allows the output of the number of the counts higher than the high threshold by counting the high count only.

In FIG. 13, therefore, an asynchronous n-bit counter 294 is connected directly to receive the high output of the first comparator 268. An asynchronous n-bit counter 296 is connected directly to receive the output 278 of the second comparator 270. In response to load signals 254, first and second loadable shift registers 298 and 200 can be loaded with the contents of the first and second asynchronous n-bit counters 294 and 296, respectively. As with the previous example, the contents of the loadable shift registers 298 and 200 can be transferred to a succeeding pixel circuit, and be loaded with the contents of a preceding pixel circuit shift register for initialising the counters.

In view of the foregoing description it will be evident to a person skilled in the art that various modifications may be made within the scope of the invention. For example, although specific embodiments of the invention have been described with reference to Mammography, embodiments of the invention may also be used in chest x-ray radiography, Dental Panoramic Tomography and Non Destructive Testing and Evaluation, for example. Additionally, the object need not move, but the radiation source and detector can move. This is particularly important for scanning parts of the human body, and in tomography the linear speed of the radiation source may not be matched by the linear TDI speed, i.e. speed of charge transfer, since it is the angular velocity of radiation source and the TDI speed which is to be kept constant. Although digital embodiments of the invention have been described with reference to serial coupled shift registers; it will be evident to a person of ordinary skill that the shift registers may be coupled in parallel.

The scope of the present disclosure includes any novel feature or combination of features disclosed therein either explicitly or implicitly or any generalisation thereof irrespective of whether or not it relates to the claimed invention or mitigates any or all of the problems addressed by the present invention. The applicant hereby gives notice that new claims may be formulated to such features during the prosecution of this application or of any such further application derived therefrom. In particular, with reference to the appended claims, features from dependent claims may be combined with those of the independent claims and features from respective independent claims may be combined in any appropriate manner and not merely in the specific combinations enumerated in the claims.

What we claim is:

1. A non-CCD imaging device for scan-imaging high energy radiation in a Time Delay Integration (TDI) mode, comprising:
   an image cell array including:
   an array of detector cells each comprising a direct-conversion material for directly converting incident radiation into charge; and
   a corresponding array of pixel circuits each comprising accumulation circuitry for accumulating charge corresponding to incident radiation on a respective detector cell of the array of detector cells,
   wherein the accumulation circuitry of a first one of the pixel circuits comprises:
      a first charge store, electrically coupled to a first detector cell of the array of detector cells; and
      a second, different, charge store,
   wherein the non-CCD imaging device is operable in first and second configurations, and the first detector cell is arranged to generate charge in response to incident radiation during both of the first and second configurations,
   wherein, in the first configuration:
      the first charge store is configured to accumulate the charge generated by the first detector cell; and
      charge is received at the first charge store from a preceding pixel circuit and combined with the charge generated by the first detector cell during the first configuration,
   and, in the second configuration:
      charge combined at the first charge store during the first configuration plus charge generated by the first detector cell during the second configuration is transferred to the second charge store.

2. An imaging device according to claim 1, wherein the accumulation circuitry of the first one of the pixel circuits comprises:
   a first switching device and a second switching device respectively associated with the first and second charge stores,
   wherein the first charge store is electrically couplable to accumulation circuitry of a preceding pixel circuit for receiving charge from the preceding pixel circuit, and the second charge store is electrically couplable to accumulation circuitry of a succeeding pixel circuit for providing charge thereto.

3. An imaging device according to claim 2, wherein in the first configuration:
   the first switching device is configured such that the first charge store is electrically isolated from the second charge store; and
   the second switching device of is configured such that the second charge store is electrically coupled to the accumulation circuitry of the succeeding pixel circuit.

4. An imaging device according to claim 2, wherein in the second configuration:
   the first switching device is configured such that the first charge store is electrically coupled to the second charge store; and
   the second switching device is configured such that the second charge store is electrically isolated from the succeeding pixel circuit.

5. An imaging device according to claim 1, wherein the first pixel circuit further comprises transfer circuitry responsive to a control signal to transfer charge value from the first pixel circuit to a succeeding pixel circuit and to load a charge value from a preceding pixel circuit to the pixel circuit.

6. An imaging device according to claim 1, controllable to transfer the charge between pixel circuits of adjacent rows of the array of pixel circuits at a speed $V_{TDI}$=pixel row spacing multiplied by a transfer frequency.

7. An imaging device according to claim 6, adapted to read a pixel image value corresponding to an accumulated charge from a last row of the array of pixel circuits at a frequency at least two times greater than the transfer frequency multiplied by the number of pixel circuits in the row.

8. An imaging device according to claim 1, wherein at least one of the first and the second charge store comprises a capacitor.

9. An imaging device according to claim 8, wherein at least one of the first and the second charge store comprises a CMOS capacitor.

10. An imaging device according to claim 9, wherein the CMOS capacitor comprises a capacitance associated with an FET.

11. An imaging device according to claim 1, wherein an amount of charge transferred between pixel circuits is controllable by a voltage comparison with respect to a reference voltage.

12. An imaging device according to claim 11, wherein the reference voltage is internally generated.

13. An imaging device according to claim 11, wherein the reference voltage is a gate threshold voltage.

14. An imaging device according to claim 1, wherein the high energy radiation comprises at least one of X-rays, gamma rays, alpha rays, and beta rays.

15. A scanning imaging system comprising an imaging device according to claim 1, and further comprising control electronics for controlling the imaging device and reading image information from the imaging device, a processor for processing the image information for display, and a display for displaying the processed information.

16. A scanning imaging system according to claim 15, further comprising a high energy radiation source disposed confronting the imaging device.

17. A scanning imaging system according to claim 16, further comprising a support for the imaging device and the high energy radiation source and adapted to move the imaging device and high energy radiation source relative to an object disposed between the imaging device and high energy radiation source.

18. A method for operating an imaging device for scan-imaging in a Time Delay Integration (TDI) mode, the imaging device comprising an image cell array including an array of detector cells each comprising a direct-conversion material for directly converting incident radiation into charge and a corresponding array of pixel circuits each comprising accumulation circuitry for accumulating charge corresponding to incident radiation on a respective detector cell of the array of detector cells, wherein the accumulation circuitry of a first one of the pixel circuits comprises a first charge store electrically coupled to a first detector cell of the array of detector cells and a second, different charge store, the method comprising alternately performing first and second steps,
wherein the detector cell is arranged to generate charge in response to incident radiation during both of the first and the second steps,
wherein the first step comprises:
    accumulating, at the first charge store, the charge generated by the first detector cell; and
    receiving, at the first charge store, charge from a preceding pixel circuit, and combining the received charge with the charge generated by the first detector cell during the first step,
and the second step comprises:
transferring charge combined at the first charge store during the first step plus charge generated by the first detector cell during the second step to the second charge store.

19. A method according to claim 18, wherein the first step further comprises electrically isolating the first charge store from the second charge store.

20. A method according to claim 19, further comprising reading a charge value from a last row of the array of pixel circuits at a speed sufficient to complete the reading prior to a next update of pixel circuits of the last row.

21. A method according to claim 18, wherein the second step further comprises:
    electrically coupling the first and second charge stores of the first pixel circuit; and
    electrically isolating the second charge store of the first pixel circuit from a charge store of a succeeding pixel circuit.

22. A method according to claim 18, further comprising transferring the charge between adjacent pixel circuits at a speed $V_{TDI}$ equal to the pixel separation multiplied by a transfer frequency.

* * * * *